United States Patent [19]

Kanehiro

[11] Patent Number: 4,935,305
[45] Date of Patent: Jun. 19, 1990

[54] METHOD OF FORMING A PLATING LAYER ON CERAMIC CHIP SURFACES AND ELECTRONIC PARTS THEREBY MANUFACTURED

[76] Inventor: Takashi Kanehiro, 121-banchi, Shiki-cho, Minami, 4-chome, Yao-shi, Osaka, Japan

[21] Appl. No.: 284,697

[22] Filed: Dec. 15, 1988

[51] Int. Cl.$^5$ .............................................. B32B 9/00
[52] U.S. Cl. ..................................... 428/457; 428/426; 428/433; 428/901; 427/46; 427/96; 427/98; 427/305; 204/51; 204/DIG. 13
[58] Field of Search ...................... 204/51, DIG. 13; 427/46, 96, 98, 305; 428/457, 426, 433, 901

[56] References Cited

U.S. PATENT DOCUMENTS

| | | | |
|---|---|---|---|
| 3,985,916 | 10/1976 | Church et al. | 427/46 |
| 4,167,460 | 9/1979 | Tomaszewski | 204/51 |
| 4,184,929 | 1/1980 | Tomaszewski et al. | 204/51 |
| 4,392,922 | 7/1983 | Tomaszewski | 204/51 |
| 4,417,955 | 11/1983 | Barclay et al. | 204/51 |

*Primary Examiner*—Patrick Ryan
*Attorney, Agent, or Firm*—Moonray Kojima

[57] ABSTRACT

This invention relates to a method of forming a plating layer on ceramic chip surfaces by electroless plating, and to electronic parts manufactured by this method. Such electronic parts include a metal film fixed resistor, a capacitor, a resistor for sensing purposes and a patterned substrate, for example. Ceramic chips are immersed in a plating solution containing chromium chloride, nickel sulfide, sodium hypophosphite, a chelating agent and thiourea. Then each ceramic chip is coated with a plating layer by electroless nickel plating while adjusting pH value of the plating solution with a pH regulating liquid. The resulting electronic parts have an initial resistance of 0.02 to 100 ohm or more and a temperature coefficient of resistance of a two-digit figure or less in ppm.

5 Claims, 1 Drawing Sheet

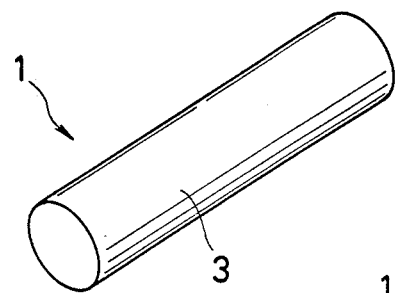
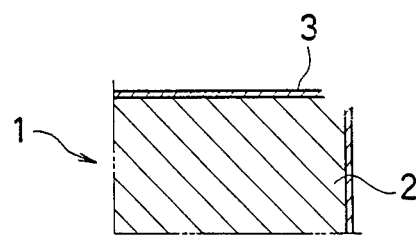
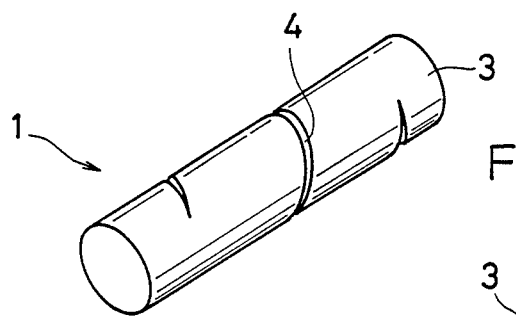
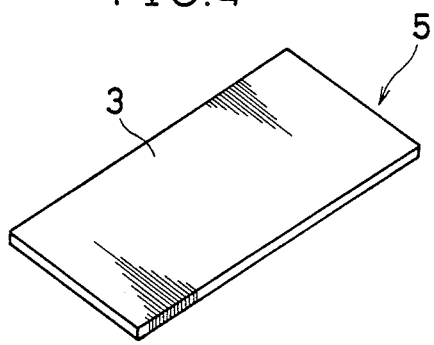
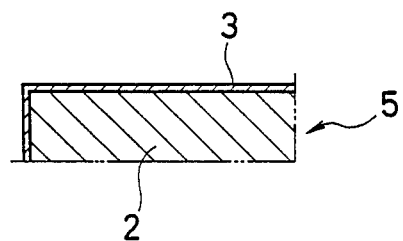

METHOD OF FORMING A PLATING LAYER ON CERAMIC CHIP SURFACES AND ELECTRONIC PARTS THEREBY MANUFACTURED

SUMMARY OF THE INVENTION

This invention relates to a method of forming a plating layer on ceramic chip surfaces by electroless plating, and to electronic parts manufactured by this method. Such electronic parts include a metal film fixed resistor, a capacitor, a detecting resistor and a patterned substrate, for example. Ceramic chips are immersed in a plating solution containing chromium chloride, nickel sulfide, sodium hypophosphite, a chelating agent and thiourea. Then each ceramic chip is coated with a plating layer by electroless nickel plating while adjusting the pH value of the plating solution with a pH regulating liquid. The resulting electronic parts have an initial resistance of 0.02 to 100 ohm or more and a temperature coefficient of resistance of a two-digit figure or less in ppm.

BACKGROUND OF THE INVENTION

Conventionally, electronic parts such as resistors, for example, are manufactured by electroless nickel plating. In this method, ceramic chips are immersed in a plating solution containing nickel sulfide ($NiSO_4.7H_2O$), hypophosphorous soda (or sodium hypophosphite $NaH_2PO_2$), a chelating agent and a stabilizer. The solution temperature is maintained at 80° to 93° C. Then each ceramic chip is coated with a plating layer of a ternary or multiplex alloy of nickel (Ni), chromium (Cr), phosphorus (P) and other metals.

The above known method, since the pH value of the plating solution changes with passage of time during the electroless plating reaction, provides a very poor yield in the manufacture of resistors having an initial resistance of 0.02 to 100 ohm or more and a temperature coefficient of resistance (TCR) of a two-digit figure or less in ppm. The plating operation must be followed by a troublesome operation of sorting the resistors into those having a temperature coefficient of resistance (TCR) of a three-digit figure in ppm and low-range resistors having a temperature coefficient of resistance (TCR) of a two-digit figure in ppm, the latter being produced accidentally. With the known method, it has been difficult to obtain electronic parts such as low-range resistors having uniform electric characteristics.

Most of the electronic parts obtained by the above known method have a temperature coefficient of resistance of high, three-digit ppm value, and therefore extensive resistance variations occur with temperature variations. Such electronic pars are hardly suited for use in outside atmosphere, for example, where temperature variations take place to a great extent.

OBJECTS OF THE INVENTION

A primary object of this invention is to provide a method of forming a plating layer on ceramic chip surfaces, which allows manufacture of electronic parts having uniform electric characteristics with an initial resistance of 0.02 to 100 ohm or more and a temperature coefficient of resistance (TCR) of a two-digit figure or less in ppm.

Another object of this invention is to provide electronic parts having a low rate of change in the resistance and thus suited for use in outside atmosphere where temperature variations take place to a great extent.

Other objects of the invention will be apparent from the description of the preferred embodiments to follow.

BRIEF DESCRIPTION OF THE DRAWINGS

The drawings show embodiments of this invention, in which:

FIG. 1 is a perspective view of a resistor comprising a ceramic chip surfacially formed with a plating layer, FIG. 2 is an enlarged sectional view of a portion of the resistor, FIG. 3 is an explanatory view showing a cut formed on the resistor for controlling its resistance, FIG. 4 is a perspective view of a substrate which is another example of electronic parts, and FIG. 5 is an enlarged sectional view of a portion of the substrate.

DESCRIPTION OF THE PREFERRED EMBODIMENTS

Embodiments of this invention will be described in detail hereinafter with reference to the drawings The drawings show electronic parts comprising a ceramic chip having plated surfaces As shown in FIGS. 1 and 2, a resistor 1, which is one example of electronic parts, comprises a ceramic chip 2 surfacially coated with a plating layer 3 of a ternary or multiplex alloy of nickel (Ni), chromium (Cr), phosphorus (P) and other metals. The plating layer 3 is formed by electroless nickel plating in a thickness of about 0.1 to several tens of microns. The resistor 1 may have an initial resistance of 0.02 to 100 ohm or more as desired, and a temperature coefficient of resistance (TCR) having a two-digit figure or less in ppm.

To obtain this resistor 1, the plating layer 3 is formed on the surfaces of the ceramic chip 2 as follows:

The ceramic chip 2 has a diameter of about 1.7mm$\phi$ and a length of about 5.5mm. The material for forming the chip may be selected, alone or in combination, from alumina ($Al_2O_3$), silicon nitride ($Si_3N_4$), carbon nitride, titanium oxide ($TiO_2$), lead oxide (PbO), zinc oxide (ZnO), lanthanum oxide ($La_2O_3$) and zirconia ($ZrO_2$ or zirconium dioxide).

The other metals mentioned above include boron (B) with atomic number 5, iron (Fe) with atomic number 26, wolfram (W) with atomic number 74 and polonium (Po) with atomic number 84.

The plating solution used has a composition as shown in the following table:

| Composition of Plating Solution | |
|---|---|
| chromium chloride | 2 to 3.5 g/l |
| nickel sulfide | metallic content of Ni: 4 to 7.5 g |
| sodium hypophosphite (reducing agent) | 10 to 20 times (4 to 7.5 g) |
| thiourea $CS(NH_2)_2$ (stabilizer) | 1/1000 to 2/1000 g/l |
| complexing agent (chelating agent) | suitable amount proportional to amount of metals (Ni, Cr, P) |

The plating operation is carried out under the following conditions:

(1) pH Value: 3.5 to 4.8
(2) Solution Temperature: 80 to 93° C.
(3) Plating Time: function-dependent
(4) Load Factor per 11 20 to 50 deci.

Moreover, the plating layer 3 of the ternary or multiplex alloy of nickel, chromium, phosphorus and other metals is formed on the surfaces of the ceramic chip 2 by electroless nickel plating while adjusting the ph value to a particular value within the range of 3.5 to 4.8 noted above. To adjust the ph value, a pH regulating liquid (solution) of caustic soda (sodium hydroxide, NaOH) or caustic potash (potassium hydroxide, KOH) in 100g per 1l is used only in a necessary amount where appropriate.

The ceramic chip 2 was immersed in the plating solution to carry out the electroless nickel plating, whereby the plating layer 3 was formed in the thickness of 0.1 to several tens of microns.

Various measurement data of the resistor 1 as obtained by the foregoing method are shown in the following table.

| Sample No. | Initial Resist. (Ω) | Overload | Rate of Change (%) | Resist. at 29.2 C. (Ω) | Resist. at 123.3 C. (Ω) | TCR (ppm/°C.) |
|---|---|---|---|---|---|---|
| 1 | 21.22 | 21.25 | 0.14 | 21.2 | 21.3 | 50.08 |
| 2 | 21.37 | 21.38 | 0.04 | 21.3 | 21.4 | 19.91 |
| 3 | 21.51 | 21.54 | 0.13 | 21.7 | 21.8 | 34.28 |
| 4 | 21.44 | 21.45 | 0.04 | 21.5 | 21.6 | 59.34 |
| 5 | 21.20 | 21.21 | 0.04 | 21.9 | 21.9 | 0.00 |
| 6 | 21.33 | 21.36 | 0.14 | 21.3 | 21.4 | 34.87 |
| 7 | 21.30 | 21.31 | 0.04 | 21.3 | 21.4 | 54.85 |
| 8 | 21.40 | 21.42 | 0.09 | 21.6 | 21.7 | 59.14 |
| 9 | 21.50 | 21.52 | 0.09 | 21.5 | 21.6 | 39.52 |
| 10 | 21.15 | 21.16 | 0.04 | 21.1 | 21.2 | 40.21 |

As seen from the above table, the temperature coefficient of resistance (TCR) of the resistor 1 obtained by the foregoing method has a maximum value at 59.34ppm/° C., a minimum value at 0.00ppm/° C, and an average value at 39.22ppm/° C.

Since the electroless nickel plating is carried out while adjusting the pH value of the plating solution against change with passage of time by using the pH regulating liquid, the resistor 1 having uniform electric characteristics is obtained which correspond to the composition of the plating solution and the plating conditions. The use of chromium chloride (CrC12 or CrC13) in the plating solution results in catalytic action of eutectoid (within 0.5% alloying ratio) of chromium (Cr) and chlorine (Cl), which combines with the other components of the plating solution during a plating operation to produce uniform resistance characteristics with the initial resistance at about 21.2 to 21.5 ohm (see the table above) and the temperature coefficient of resistance (TCR) at two-digit figures or less in ppm.

The initial resistance may be set as desired within a range of 0.02 to 100 ohm by varying the plating conditions.

Further, the resistance of the resistor 1 may be adjusted as desired by varying the thickness of the plating layer 3 or by forming a cut 4 (FIG. 3) in the plating layer 3 with automatic cutting means.

It will readily be understood from the theory of electricity that the resistance will decrease if the thickness of the plating layer 3 is increased, and increase if the thickness of the layer 3 is decreased.

Since the resistor 1 has a temperature coefficient of resistance (TCR) at a two-digit figure or less in ppm, its resistance is variable only to a very small extent with temperature variations. This feature advantageously allows the resistor 1 to be used in outside atmosphere where extensive temperature variations take place.

Thus the resistor 1 may be used as a metal film fixed resistor, and a resistor for sensing purposes The plating layer 3 containing phosphorus (P) has a metastable structure suited for soldering. Consequently, a component corresponding to a conventional resistor cap is not required, and lead wires may be connected directly to the resistor 1.

FIGS. 4 and 5 show another example of electronic parts manufactured by the same method as in the foregoing embodiment. This embodiment comprises a substrate 5 as opposed to the resistor shown in FIGS. 1 through 3.

The substrate 5 comprises a ceramic chip 2 about 25mm long, 51mm wide and 1mm thick, which is surfacially coated with a plating layer 3 of a ternary or multiplex alloy of nickel, chromium, phosphorus and other metals. The plating layer 3 is formed by electroless nickel plating in a thickness of about 0.1 to several tens of microns. The substrate 5 has an initial resistance of 0.02 to 100 ohm or more as desired, and a temperature coefficient of resistance (TCR) having a two-digit figure or less in ppm.

The composition of the plating solution and the plating conditions are similar to those in the foregoing embodiment.

After the ceramic chip 2 is treated over its entire surfaces with electroless nickel plating, the surfaces are exposed except where selected patterns (not shown) are printed by silk screening. Then a patterned substrate (which corresponds to a known printed circuit board) is produced.

On the other hand, preparatory to the electroless nickel plating step, the ceramic chip 2 may be masked with a resist where the selected patterns are to be formed. When this ceramic chip 2 is subjected to the electroless nickel plating by the described method, the plating layer 3 is formed except where the resist is applied. Thus a patterned substrate is formed by removing the resist after the electroless nickel plating step.

Since, as in the foregoing embodiment, the substrate 5 has a temperature coefficient of resistance (TCR) at a two-digit figure or less in ppm, its pattern resistance is variable only to a very small extent with temperature variations. This feature advantageously allows the substrate 5 to be used in outside atmosphere where extensive temperature variations take place.

The two embodiments have been described in relation to the resistor 1 and the patterned substrate 5 as examples of electronic parts. This invention, of course, is applicable to manufacture of a capacitor as well. In this case, dielectric ceramics such as barium titanate (BaO-TiO2) is formed with the plating layer 3 by the described method, and unnecessary portions of the plating layer 3 are removed.

I claim:
1. A device comprising
a ceramic substrate having at least one surface; and
a layer formed on the at least one layer to a thickness of 0.1 microns to several tens of microns, and comprising a ternary or multiplex alloy of at least tens of microns, and comprising a ternary or multiplex alloy of at least nickel, chromium, and phosphorus, so that the device has an initial resistance of 0.02 ohm to at least 100 ohms, and a temperature coefficient of resistance of two digits or less in ppm.
2. The device of claim 1, wherein the layer comprises a ternary or multiplex alloy of nickel, chromium, phosphorus, and one or more other metals.

3. The device of claim 1, wherein the device has an initial resistance of over 100 ohms.

4. A method of plating a ceramic substrate comprising the steps of
- mixing 2 to 3.5 g/l of chromium chloride, 4 to 7.5 g/l metallic content of nickel sulfide, 4 to 7.5 g/l of sodium hypophosphite, 0.001 to 0.002 g/l of thiourea, and a chelating agent in an amount proportion the amount of aforementioned metallic compounds, to form a plating solution;
- placing the ceramic substrate into said plating solution;
- continually adjusting the pH value to be between 3.5 to 4.8 pH of said plating solution by adding a pH regulating liquid;
- adjusting the temperature of the plating solution to be between 80° C. to 93° C.; and
- electroless plating the ceramic substrate so that at least one surface thereof has formed thereon a layer of ternary or multiplex alloy of at least nickel, chromium and phosphorus.

5. The method of claim 4, wherein the plating solution contains one or more other metal compounds, and wherein the layer formed on the substrate surface comprises a ternary or multiplex layer of nickel, chromium, phosphorus, and one or more metals.

* * * * *